UNITED STATES PATENT OFFICE.

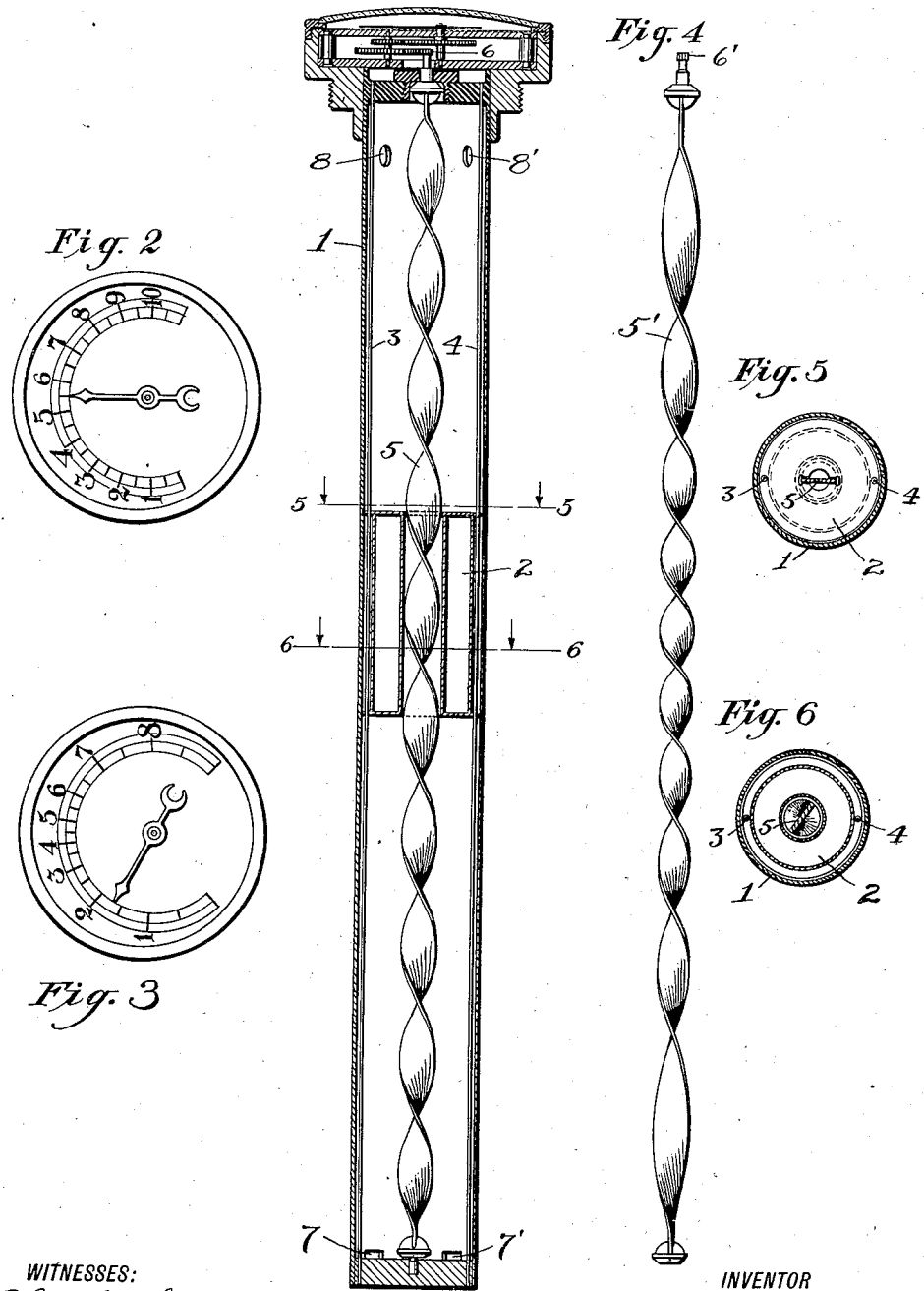

PETER GRAHAM MACGREGOR, OF NEW YORK, N. Y., ASSIGNOR TO PETER L. WILBUR, OF NEW YORK, N. Y.

INDICATING-GAGE.

1,070,973.   Specification of Letters Patent.   Patented Aug. 19, 1913.

Application filed February 3, 1912. Serial No. 675,149.

*To all whom it may concern:*

Be it known that I, PETER G. MACGREGOR, a citizen of the United States, and resident of the city, county, and State of New York, have invented certain new and useful Improvements in Indicating-Gages, of which the following is a specification.

This invention relates to a gaging device adapted to be used in connection with a reservoir or tank containing a liquid to indicate the amount of liquid contained therein.

The object of the invention is to provide a device which may be used in connection with or attached to tanks of any shape and which, on account of its peculiar features of construction, will indicate the amount of liquid therein as the same is gradually emptied or refilled.

One of the important uses of the device is in connection with a gasolene tank of an automobile. These tanks are of various shapes, some being rectangular in form others in the form of a cylinder laid on its side and others oval in shape. It is obvious that with tanks of these various shapes the level of the liquid will change at varying rates and the object of this invention is to provide a device which will accurately indicate by a suitable dial or indicator, the amount of liquid therein at any time.

Some of the preferred constructions have been illustrated in the accompanying drawings and will be described more fully hereinafter and the novel features defined in the accompanying claims.

In the drawing like parts in the several views have been given the same reference numerals. Figure 1 is a sectional elevation of an indicating gage embodying the invention. Fig. 2 is a plan view of one form of an indicating dial. Fig. 3 is a plan view of another form of indicating dial. Fig. 4 is a detail view in elevation, showing one form of a portion of the operating mechanism. Fig. 5 is a sectional plan view, taken on the line 5—5 of Fig. 1. Fig. 6 is a sectional plan view, taken on the line 6—6 of Fig. 1.

Referring to Fig. 1 the cylindrical body portion of the gage is shown at 1. At 2 is shown a float, which is in the form of a closed cylindrical chamber and which is of a size to permit it to be freely moved longitudinally in the body portion 1.

Guide members 3 and 4 are secured at their upper and lower ends in the body portion 1 and extend through openings in the float 2, the float 2 being provided with flanges at its upper and lower ends in which these openings are placed. These openings are of sufficient size to permit the float to move freely upon the guides 3 and 4 but prevent the same from rotating.

A spirally formed member 5, preferably formed by twisting a flat strip of metal into a spiral form, is mounted in the body portion 1 provided with suitable bearings at its upper and lower ends so as to be freely rotatable. At the upper end of the spiral member 5 is mounted a pinion 6 by means of which the rotary movement is communicated through suitable reducing gears to the indicator or pointer mounted above the dial.

The float 2 is provided at one end with a rectangular slot through which the spiral member passes. This slot is of such a size as to slide freely over the spiral member 5 as the float rises and falls with the varying level of the liquid. As the float is held against rotating by the guides 3 and 4, it will be seen that this longitudinal movement of the float 2 will cause a rotary movement of the spiral member 5 which will be communicated to the indicator at the upper end of the device.

Openings 7 and 7' are provided at the lower end of the cylindrical body portion 1 to allow the liquid to enter to the interior thereof and openings 8 and 8' are provided at the upper end thereof to provide for the escape of the air as the liquid enters.

When the gage is used in connection with a rectangular tank the spiral member 5 will be of a uniform pitch for its entire length and the dial of the indicator will be divided into uniform divisions, as shown in Fig. 2. When the gage is used in connection with a round or oval tank it becomes necessary to provide for an unequal rise of the float in order to indicate the amount of liquid. If the spiral member 5 is of a uniform pitch this may be done by varying the divisions upon the dial, as shown in Fig. 3. It is more desirable, however, in order to facilitate the reading of the dial to use divisions of equal length and this may be done with the present invention by constructing the spiral member as shown at 5', in Fig. 4, in which the pitch of the spiral is varied, decreasing from the lower end to the center and increasing from the center to the upper end. The rate of variation of the pitch of the spiral member 5' will, of course, be determined by the shape of the tank in which the gage is to be used and will vary inversely as the horizontal cross sectional area of the containing tank. A pinion 6' carried at the upper end of the spiral member 5' operates the indicating pointer in the same manner as that described and shown in Fig. 1.

It will thus be seen that an indicating gage is provided which may be used in connection with tanks of any shape and by constructing the spiral actuating member with suitable variations in the pitch of its spirals the amount of liquid will be indicated on a dial having uniform divisions which are easily read at a glance.

As many changes could be made in the above construction and many apparently widely different embodiments of my invention designed without departing from the scope of the appended claims, I intend that all matter contained in the above description or shown in the accompanying drawings shall be interpreted as illustrative merely of an operative embodiment of my invention and not in a limiting sense.

What I claim is:

1. In an indicating gage adapted to be used in a reservoir of variable horizontal cross sectional area, containing a liquid, in combination, a dial, a movable indicator adapted to indicate on said dial the amount of liquid in said reservoir, a float adapted to be moved as the amount of liquid in said reservoir is changed, and means operatively connecting said float and indicator for transmitting the movement of the former to the latter and adapted to cause said indicator to move over equal spaces on said dial for equal changes in the amount of liquid in said reservoir, said means being adapted to compensate for the variable horizontal cross sectional areas corresponding to various levels of the liquid.

2. In an indicating gage, in combination, a dial, an indicator, a rotatable spiral member having a varying pitch varying inversely as the horizontal cross sectional area of the containing tank and operatively connected to said indicator, and a float slidably mounted upon said spiral member and adapted to rotate the same when moved longitudinally with relation thereto.

3. In an indicating gage, in combination, a dial, an indicator, a rotatable spiral member having a varying pitch varying inversely as the horizontal cross sectional area of the containing tank decreasing from one end and operatively connected to said indicator, and a float slidably mounted upon said spiral member and adapted to rotate the same when moved longitudinally with relation thereto.

4. In an indicating gage, in combination, a dial, an indicator, a rotatable spiral member having a varying pitch varying inversely as the horizontal cross sectional area of the containing tank decreasing from one end to the center and operatively connected to said indicator, and a float slidably mounted upon said spiral member and adapted to rotate the same when moved longitudinally with relation thereto.

5. In an indicating gage, in combination, a dial, an indicator, a rotatable spiral member having a varying pitch varying inversely as the horizontal cross sectional area of the containing tank decreasing from one end to the center and increasing from the center to the opposite end and operatively connected to said indicator, and a float slidably mounted upon said spiral member and adapted to rotate the same when moved longitudinally with relation thereto.

Signed at New York city, in the county and State of New York, this 15th day of January, 1912.

PETER GRAHAM MacGREGOR.

Witnesses:
 PETER L. WILBUR,
 LEWIS J. DOOLITTLE.